UNITED STATES PATENT OFFICE.

GEORGE F. BIHN, OF PHILADELPHIA, PENNSYLVANIA, ASSIGNOR TO THE PENNSYLVANIA SALT MANUFACTURING COMPANY, OF SAME PLACE.

METHOD OF OBTAINING HYDRATE OF ALUMINA FOR PAPER-MAKERS' USE FROM BAUXITE, &c.

SPECIFICATION forming part of Letters Patent No. 331,182, dated November 24, 1885.

Application filed September 14, 1885. Serial No. 177,129. (No specimens.)

*To all whom it may concern:*

Be it known that I, GEORGE F. BIHN, of the city and county of Philadelphia, State of Pennsylvania, have invented a new and improved method of obtaining hydrated alumina, free from iron, from the mineral bauxite, or other suitable chemical compound of alumina, iron and silica, for use as a "filler" in the manufacture of paper or in the preparation of pure sulphate of alumina for paper-maker's use, of which the following is a specification.

It is a well-known fact that bauxite, a mineral containing alumina and iron, can be decomposed by calcining an intimate and finely-ground mixture of the three materials: first, bauxite; second, sodium sulphate, (either pure or in the form of "salt-cake,") and, third, coal or other form of carbon. It is also well known that if the calcined mass thus obtained be lixiviated with water the resulting liquor contains sodium aluminate, sodium sulphide, and iron sulphide in solution. If carbonic-acid gas, either in its pure state or mixed with air or other gases, be passed through this liquor, not only does the alumina precipitate in the insoluble form, but more or less iron is also thrown down in an insoluble condition with the hydrated alumina.

In the manufacture of white paper it is desirable to use materials free from iron.

My invention consists in a new and economical method of obtaining from bauxite hydrated alumina free from iron by first preparing a ferruginous solution of sodium-aluminate in the ordinary manner, and then separating the iron by means of copper, or a compound of copper, before precipitating the alumina hydrate by means of carbonic-acid gas.

The following description will enable any one skilled in the art to which my invention most nearly appertains to carry it into practice.

I first prepare by grinding or otherwise an intimate mechanical mixture of bauxite, sodium sulphate, and coal. I prefer to use bauxite containing fifty per cent. (50%) or more of anhydrous alumina, but a less alumina content will answer. I prefer on economic grounds to use the sodium sulphate in the form of ordinary salt cake. I also prefer to use bituminous or semi-bituminous coal, though other forms of carbon may be employed.

The relative proportions of bauxite, salt-cake, and coal necessary to produce the best results will depend not only upon the alumina content of the bauxite employed, but upon the quality of the salt-cake and the character of the coal. It may be stated in general terms that six hundred pounds (600 lbs.) of bauxite containing sixty per cent. (60%) of anhydrous alumina will require thirteen hundred pounds (1300 lbs.,) more or less, of salt-cake and six hundred pounds (600 lbs.,) more or less, of coal.

The finely-ground and thoroughly-incorporated mixture of the above is to be calcined in a suitable furnace at a moderate heat during three (3) hours, (more or less,) according to the quality of ingredients and the temperature of the furnace. After the calcination is finished I lixiviate the calcined mass with water and remove by decantation or otherwise the resulting liquor, which contains in solution sodium aluminate and sulphur in combination with sodium and iron.

The next step in my process is to separate the sulphur from the iron, whereby the iron is converted into an insoluble form and precipitates. To effect this object, I introduce into the liquor finely-precipitated metallic copper (that obtained from the metallurgy of copper in the wet way is very convenient) or some suitable compound of copper, and then boil by steam or otherwise until the sulphur has been separated from both the iron and the sodium, as indicated, by filtering off the insoluble matter from a small portion of the liquor and applying the usual test for sulphides in solution.

The amount of finely-precipitated copper required will depend upon the amount of sulphur in the sodium aluminate solution. It may be stated in general terms that for every one hundred pounds (100 lbs.) of the sulphides of sodium and iron contained in the solution there will be required forty-five pounds (45 lbs.) more or less of finely-precipitated copper.

In place of metallic copper, the oxide or oxysulphide of the same metal in proportion equivalent to precipitation may be used. The amount employed must be such as to furnish sufficient copper to withdraw from the solution all the sulphur therein contained. The liquor must now be separated, by decantation or otherwise, from the insoluble matter, which contains all the copper added to the liquor as well as the iron previously held in solution. From the clear liquor, which contains sodium aluminate and other compounds of sodium, I precipitate hydrated alumina free from iron by means either of carbonic-acid gas or bicarbonate of soda in the usual way. I separate the insoluble hydrated alumina from the solution of soda in the ordinary manner, then wash it thoroughly with water. The hydrated alumina thus obtained can then be dried by steam or other means for use as a filler in the manufacture of fine paper; or it can be dissolved either before or after drying in the proper quantity of sulphuric acid to produce a sulphate of alumina free from iron to be used in sizing paper.

Instead of always using finely-precipitated metallic copper or copper oxide to remove the sulphur from the sodium-aluminate solution, I prefer to employ (until it becomes too impure by frequent use) the copper oxysulphide obtained by calcining the washed residue left from a previous operation. The amount of copper oxysulphide required must be sufficient to withdraw all the sulphur combined with the sodium and iron in the solution.

I am aware that copper oxide has been employed in the manufacture of carbonate of soda and caustic soda to remove sulphur from the sodium-sulphuret solution obtained by calcining salt-cake with coal or other forms of carbon. This use of oxide of copper I do not claim; but What I do claim, and desire to secure by Letters Patent, is—

1. The process herein described of manufacturing artificial hydrated alumina free from iron as a filler or for the production of sulphate of alumina to be used in the manufacture of paper, substantially as herein set forth.

2. The process herein described of producing from bauxite artificial hydrated alumina free from iron, substantially as herein set forth.

3. The process herein described of producing from bauxite artificial hydrated alumina free from iron, the process consisting, essentially, in first calcining an intimate mixture of bauxite, salt-cake, and coal, lixiviating the calcined mass with water, separating the liquid thus obtained from the insoluble matter, then boiling the clear liquor with finely-divided metallic copper or a suitable compound of copper, then separating the liquor thus obtained from insoluble matter, then precipitating hydrated alumina from the clear solution by carbonic-acid gas or bicarbonate of soda, and, finally, washing this insoluble product with water and drying the same by steam or otherwise, substantially as herein set forth.

GEORGE F. BIHN.

Witnesses:
T. ARMSTRONG,
JOEL G. CLEMMER.